(12) United States Patent
Pennala et al.

(10) Patent No.: US 11,326,495 B2
(45) Date of Patent: May 10, 2022

(54) SYSTEM AND METHOD FOR PREDICTING VALIDITY OF $NO_X$ SENSOR OUTPUT

(71) Applicant: Ford Global Technologies, LLC, Dearborn, MI (US)

(72) Inventors: Dean Pennala, Howell, MI (US); Justin Trzeciak, Riverview, MI (US); Frank M. Korpics, Belleville, MI (US); Jim Bromham, Trowbridge (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/937,788

(22) Filed: Jul. 24, 2020

(65) Prior Publication Data

US 2022/0025806 A1 Jan. 27, 2022

(51) Int. Cl.
| | |
|---|---|
| *F01N 3/22* | (2006.01) |
| *F01N 11/00* | (2006.01) |
| *F01N 3/20* | (2006.01) |
| *F02D 41/00* | (2006.01) |
| *F02D 41/02* | (2006.01) |
| *F02D 41/14* | (2006.01) |

(52) U.S. Cl.
CPC .............. *F01N 3/225* (2013.01); *F01N 11/00* (2013.01); *F01N 3/208* (2013.01); *F01N 2560/026* (2013.01); *F01N 2610/02* (2013.01); *F02D 41/0077* (2013.01); *F02D 41/0235* (2013.01); *F02D 41/146* (2013.01); *F02D 2200/0802* (2013.01)

(58) Field of Classification Search
CPC ...... F01N 3/225; F01N 11/00; F01N 2610/02; F01N 3/208; F01N 2560/026; F02D 41/146; F02D 41/0235; F02D 41/0077; F02D 2200/0802
See application file for complete search history.

(56) References Cited

U.S. PATENT DOCUMENTS

| | | | |
|---|---|---|---|
| 7,159,551 B2 | 1/2007 | Cecur et al. | |
| 7,404,383 B2 | 7/2008 | Elendt | |
| 9,605,603 B2 | 3/2017 | Glugla et al. | |
| 2008/0148721 A1* | 6/2008 | Wirth | F01N 3/005 60/295 |
| 2015/0252714 A1* | 9/2015 | Ancimer | F01N 3/2066 60/605.1 |
| 2018/0135541 A1* | 5/2018 | Hsieh | F02P 5/145 |
| 2019/0136754 A1* | 5/2019 | Brin | F02B 39/04 |
| 2021/0222597 A1* | 7/2021 | Lindell | F01N 11/00 |

* cited by examiner

*Primary Examiner* — Brandon D Lee
(74) *Attorney, Agent, or Firm* — Geoffrey Brumbaugh; McCoy Russell LLP (57) ABSTRACT

Methods and systems for operating an engine that includes a controller and a NOx sensor are described. In one example, output of the NOx sensor is selectively made available to software modules within the controller when an offset in NOx sensor output is not expected. If the offset in NOx sensor output is expected, the NOx sensor output may not be made available to the software modules.

8 Claims, 8 Drawing Sheets

FIG. 8

SYSTEM AND METHOD FOR PREDICTING VALIDITY OF NO$_X$ SENSOR OUTPUT

BACKGROUND/SUMMARY

Control of engine emissions may be performed based on expected engine emissions for a particular engine speed and load. For example, an amount of exhaust gas recirculation (EGR) that is supplied to an engine may be adjusted according to engine speed and load so that engine NOx emissions may be reduced. Thus, engine emissions may be reduced by determining two observable engine conditions. However, adjusting engine actuators to control engine emissions solely based on engine speed and load may not be sufficient to meet target emissions levels. Therefore, an engine of a vehicle may be equipped with a NOx sensor to sense a presence of NOx in the engine's exhaust gases. If the engine is outputting NOx levels that are higher than desired and the NOx sensor reports these levels to an engine controller, the engine controller may take mitigating actions, such as notifying the vehicle's operator to service the vehicle. Yet, output of a NOx sensor may not always be reliable. Consequently, if actions are taken by the controller based on uncertain NOx sensor output, the actions may be improper. Therefore, it may be desirable to determine conditions during which output of a NOx sensor is expected to be reliable.

The inventors herein have recognized the above-mentioned disadvantages and have developed an engine operating method, comprising: adjusting operation of an engine via a controller in response to output of a NOx sensor when output of the NOx sensor is judged valid, the output of the NOx sensor judged valid via the controller when an actual exhaust energy delivered to an exhaust system for a present vehicle trip is greater than a heat energy threshold.

By adjusting engine operation in response to output of NOx sensor after an actual exhaust energy delivered to an exhaust after treatment system for a present vehicle trip is greater than a heat energy threshold, it may be possible to operate the engine in response to NOx sensor output when NOx sensor output is expected to be more reliable. In particular, heat energy within the exhaust system may cause thermal decomposition of urea within an after treatment system, which may result in a positive bias to NOx sensor output. However, after energy supplied to the after treatment system exceeds a threshold level, urea may be purged from the after treatment system so that output of the NOx sensor may not be biased. In this way, it may be possible to respond to NOx sensor output at an earliest time after urea thermal decomposition may be complete so that desired engine emissions levels may be provided with a lower fuel economy penalty.

The present description may provide several advantages. In particular, the approach may improve engine emissions. In addition, the approach may reduce engine fuel consumption while reducing engine emissions. Further, the approach compensates for ambient temperature so that judgement of NOx sensor output may be reliable.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
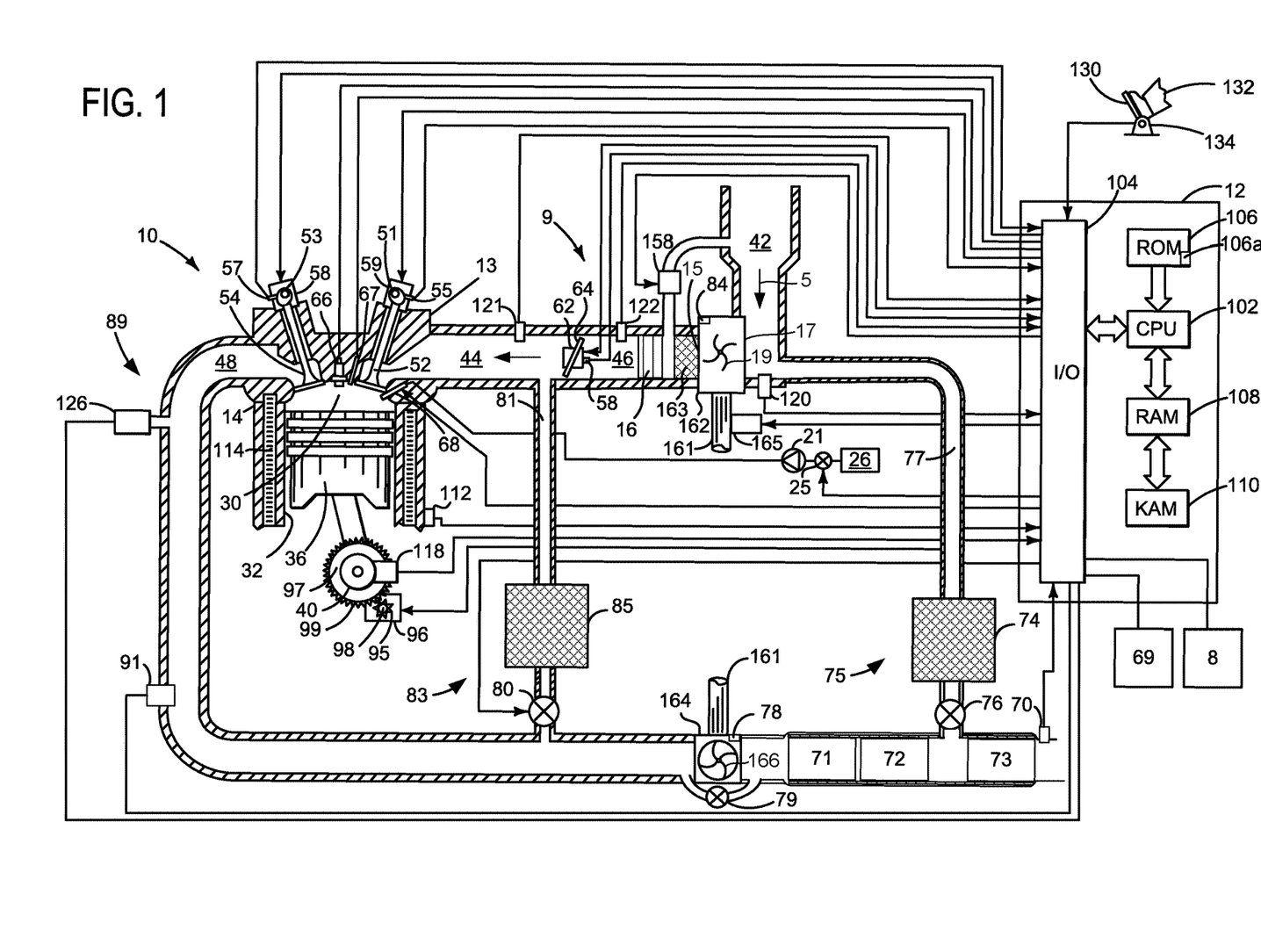
FIG. 1 shows a detailed schematic depiction of an example engine.
Figure 2:
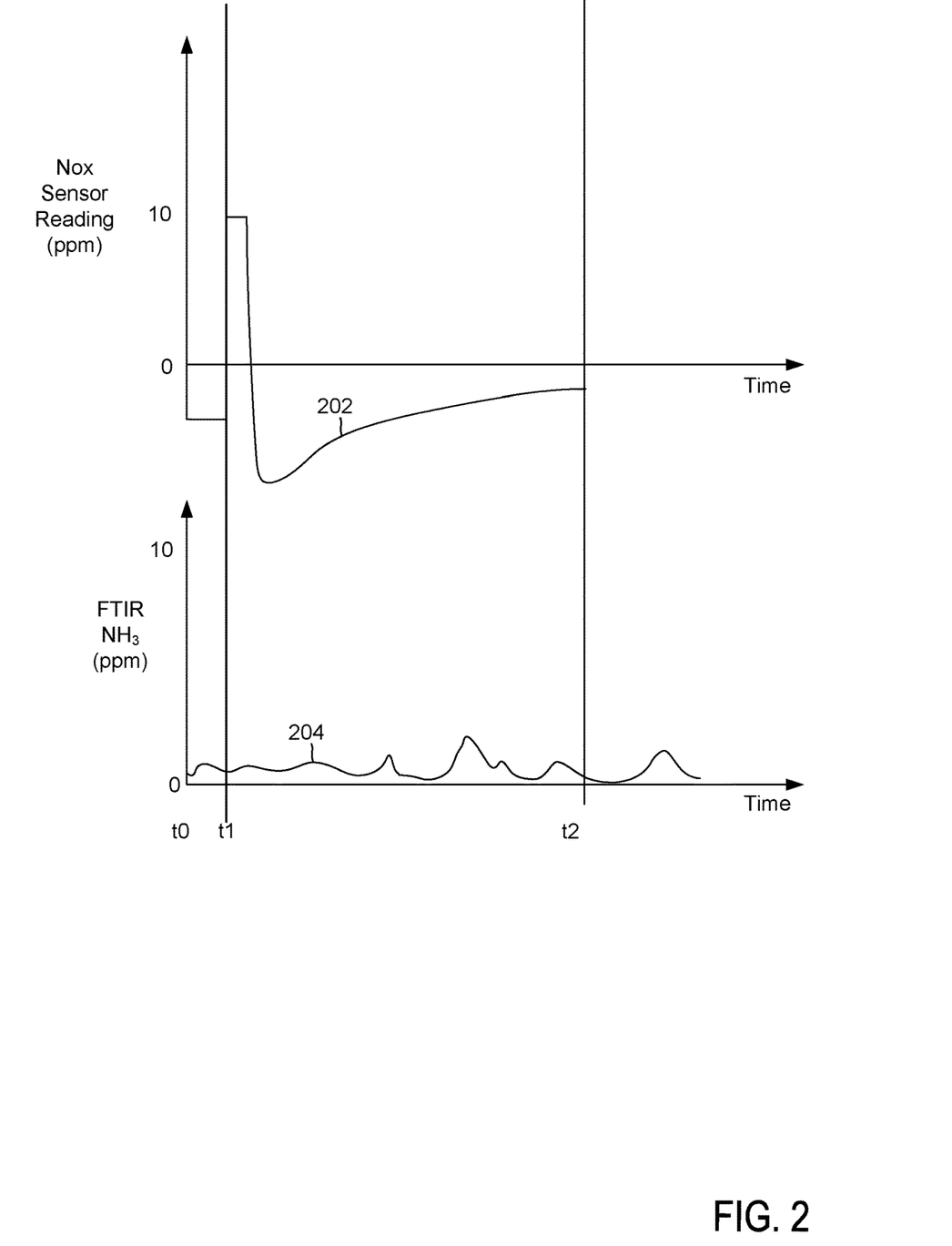
FIG. 2 shows example plots for a NOx sensor that does not exhibit an offset output.
Figure 3:
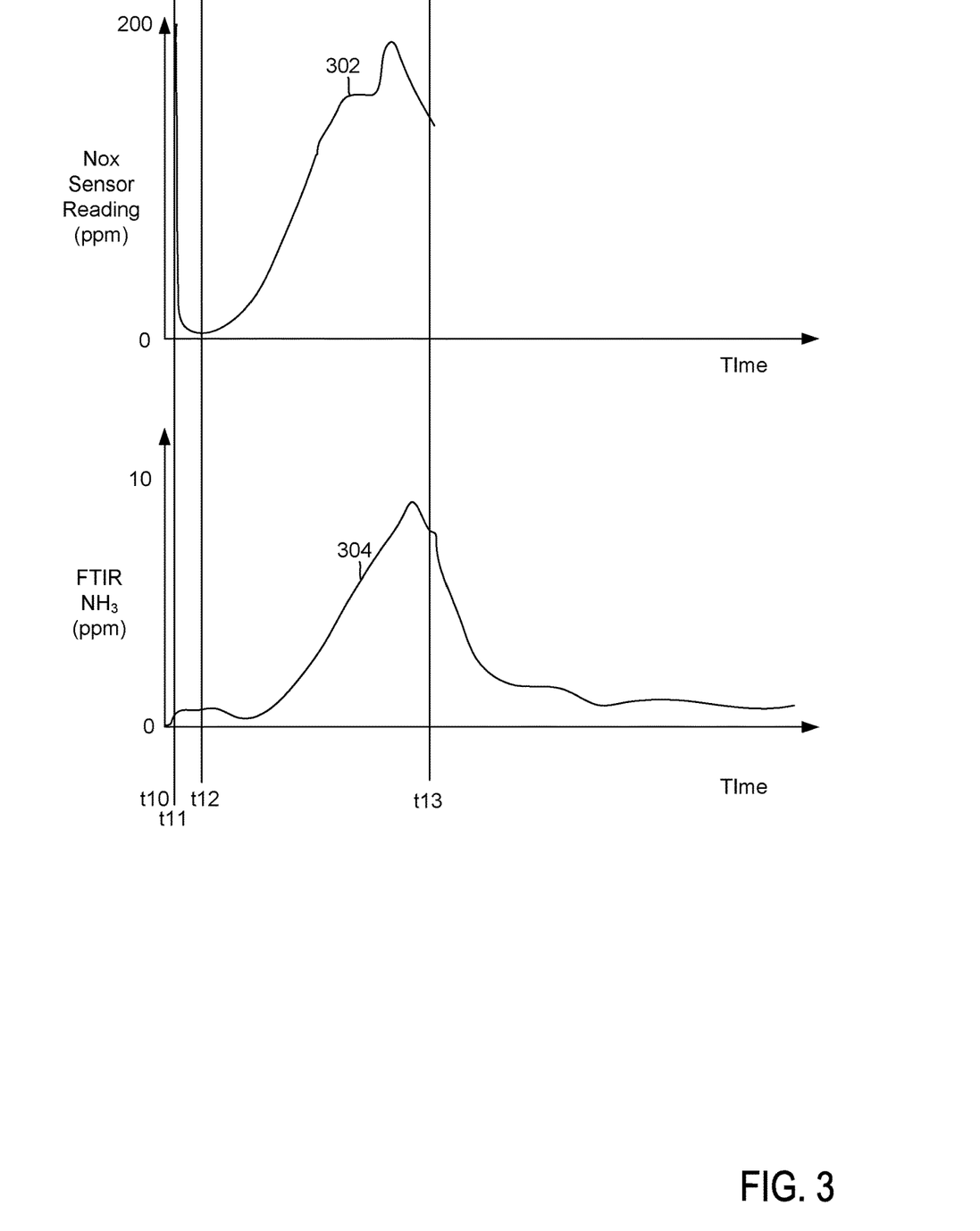
FIG. 3 shows example plots for a NOx sensor that exhibits an offset output.
Figure 4:
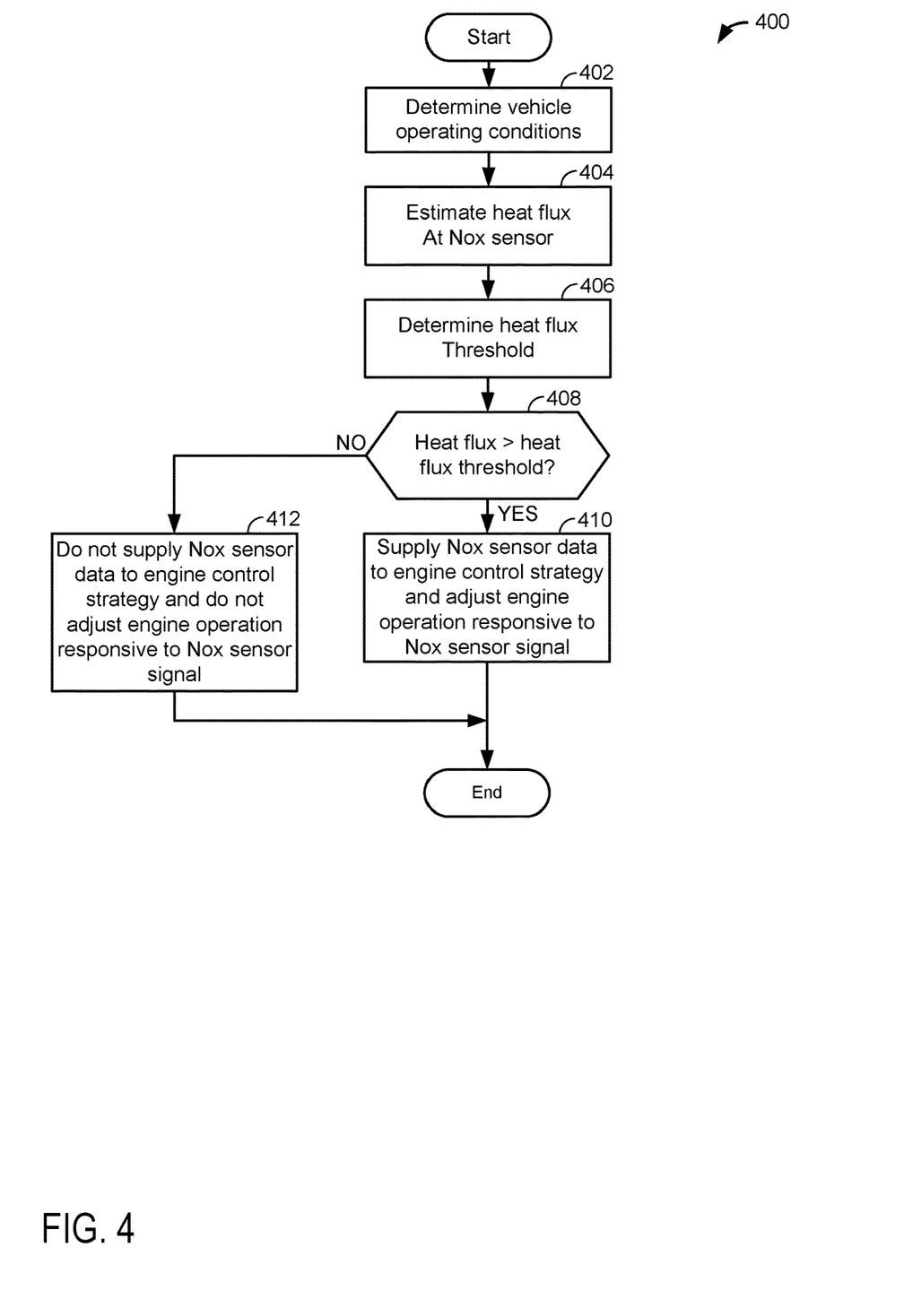
FIG. 4 shows a flowchart of a method for operating an engine that includes a NOx sensor.
Figure 5:
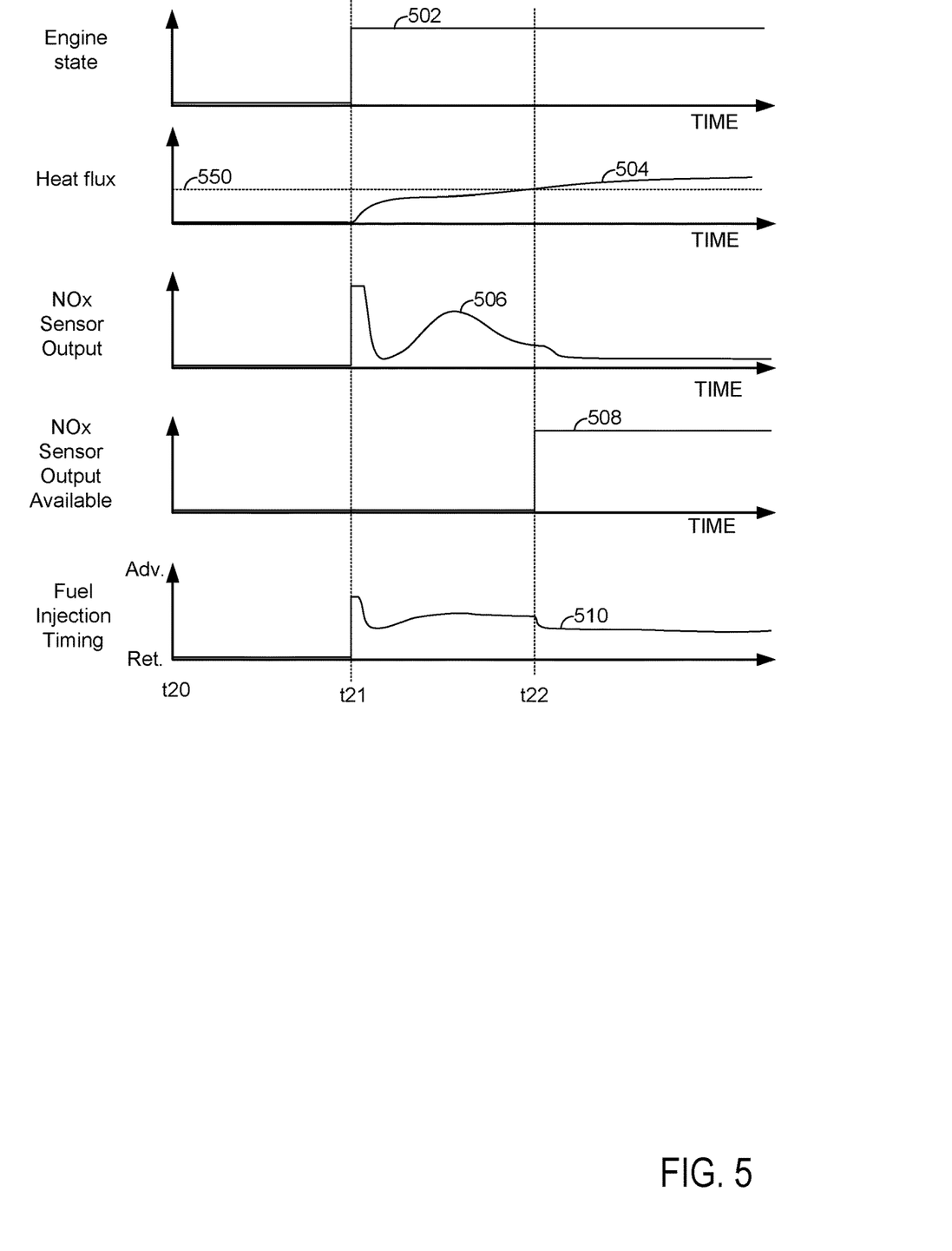
FIG. 5 shows an example engine operating sequence according to the method of FIG. 4.
Figure 6:
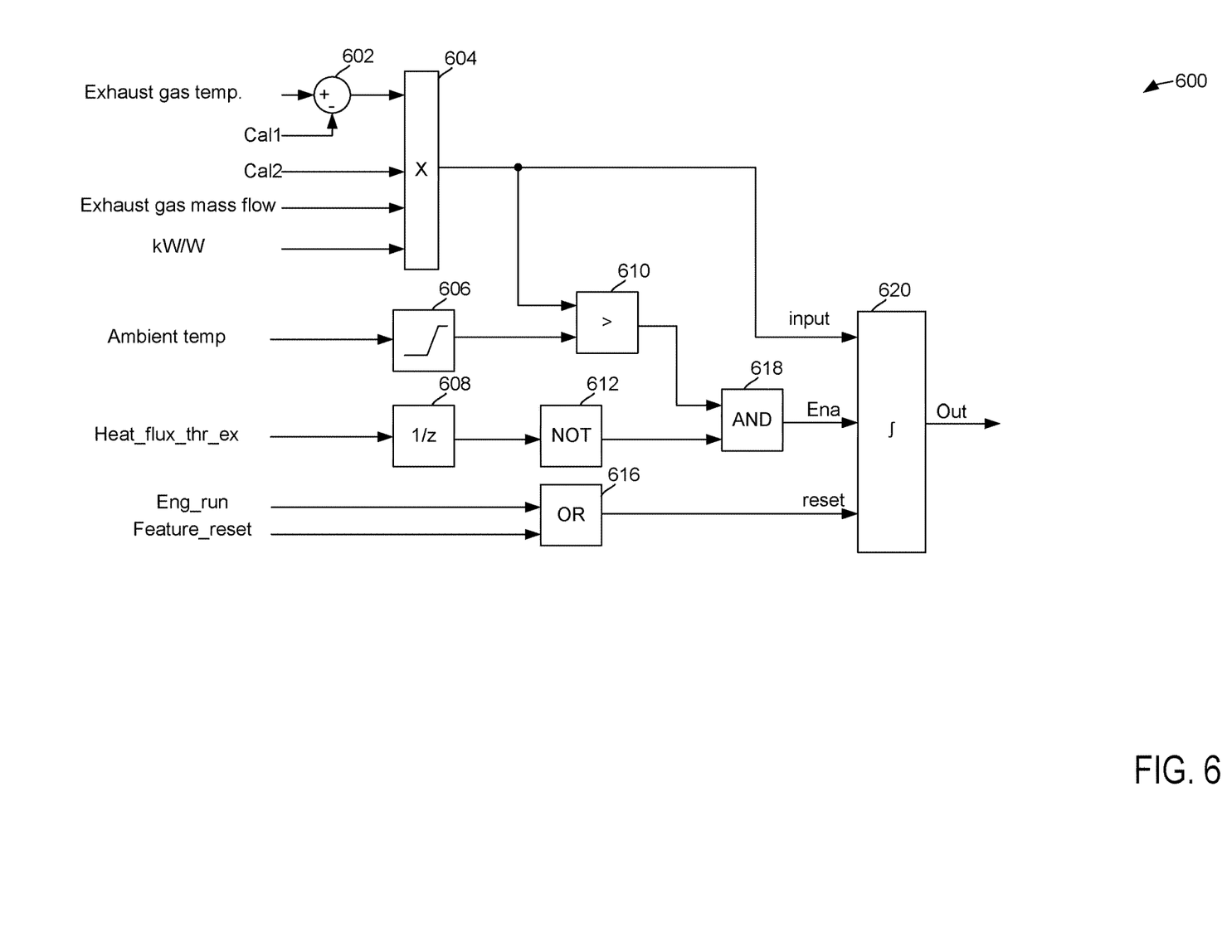
FIGS. 6-8 show example block diagrams of portions of the method of FIG. 4.
Figure 7:
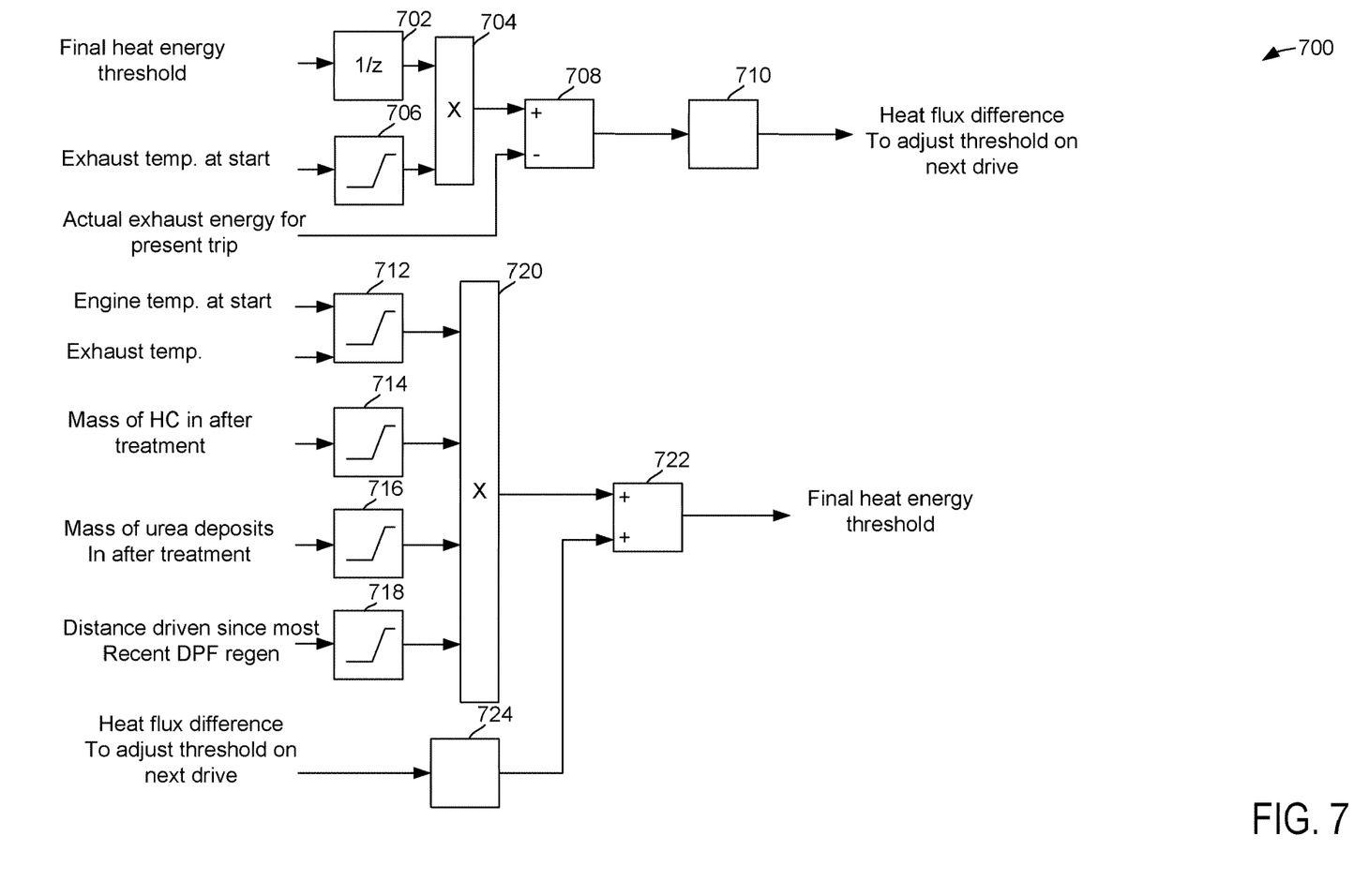
Figure 8:
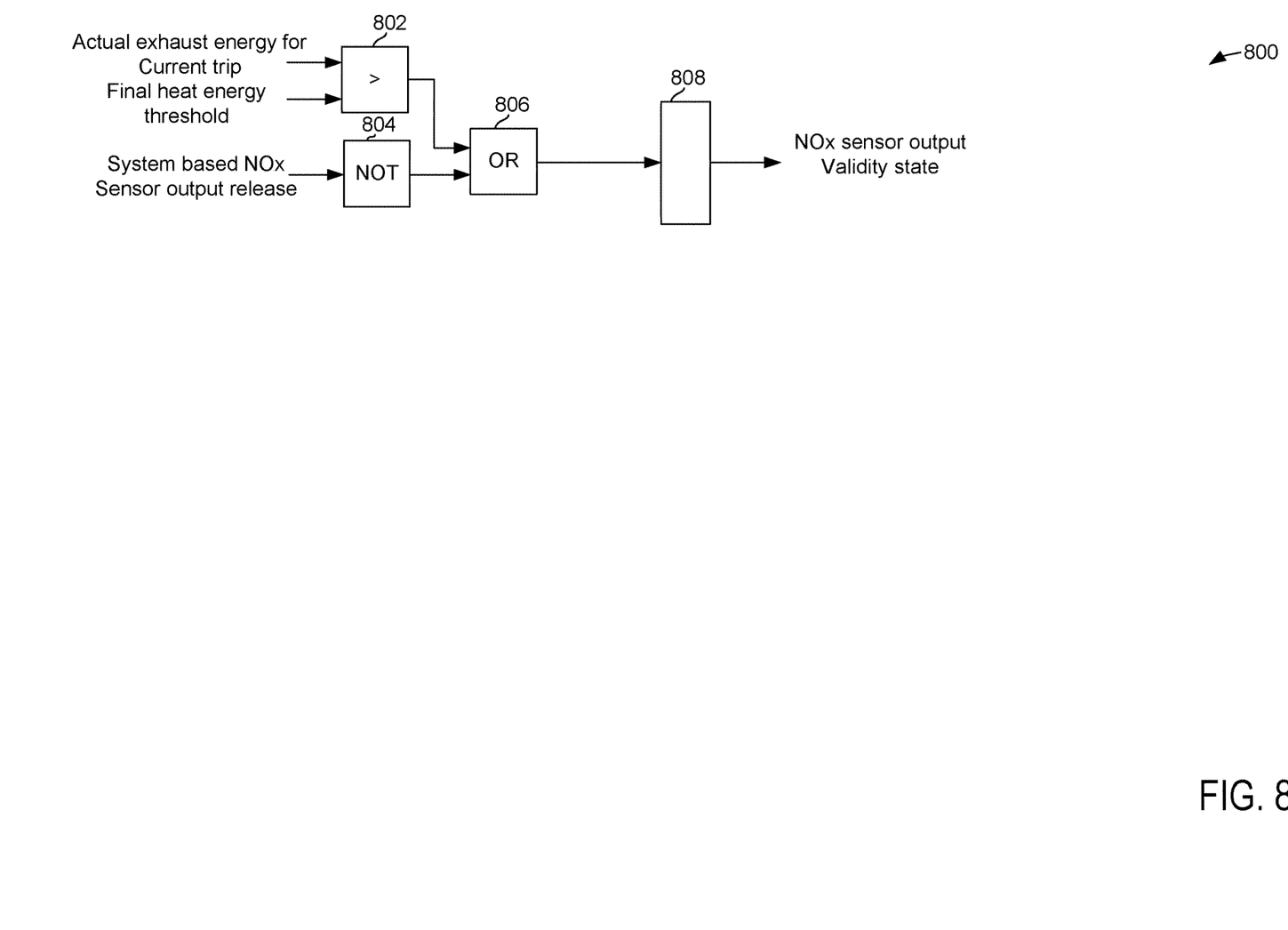

The present description is related to operating an engine that includes a NOx sensor. In one example, the engine may be a diesel engine as shown in FIG. 1. The engine may include a NOx sensor that exhibits output as shown in FIG. 2 when the NOx sensor is new. The engine may include a NOx sensor that exhibits output as shown in FIG. 3 when the NOx sensor is aged. The engine may be operated according to the method of FIG. 4 to reduce a possibility of responding to output of a NOx sensor that is responding to NH$_3$ as the NOx sensor warms. In particular, the present method may prohibit use of NOx sensor output until a heat flux threshold has been exceeded. After the heat flux threshold has been exceeded, the confidence level of NOx sensor output may be sufficient to adjust engine operation in response to NOx sensor output. An example engine operating sequence according to the method of FIG. 4 is shown in FIG. 5. FIGS. 6-8 show example block diagrams of portions of the method described in FIG. 4.

Referring to FIG. 1, internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 1 to adjust engine operation based on the received signals and instructions stored on a memory of the controller.

Engine 10 includes combustion chamber 30 and cylinder walls 32 with piston 36 positioned therein and connected to crankshaft 40. Cylinder head 13 is fastened to engine block 14. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Although in other examples, the engine may operate valves via a single camshaft or pushrods. The position of intake cam 51 may be determined by intake cam sensor 55. The position of exhaust cam 53 may be determined by exhaust cam sensor 57. Intake poppet valve 52 may be operated by a variable valve activating/deactivating actuator 59, which may be a cam driven valve operator (e.g., as shown in U.S. Pat. Nos. 9,605,603; 7,404,383; and 7,159,551 all of which are hereby fully incorporated by reference for all purposes). Likewise, exhaust poppet valve 54 may be operated by a variable valve activating/deactivating actuator 58, which may a cam driven valve operator (e.g., as shown in U.S. Pat. Nos. 9,605,603; 7,404,383; and 7,159,551 all of which are hereby fully incorporated by reference for all purposes). Intake poppet valve 52 and exhaust poppet valve 54 may be deactivated and held in a closed position preventing flow into and out of cylinder 30 for one or more entire engine cycles (e.g. two engine revolutions), thereby deactivating cylinder 30. Flow of fuel supplied to cylinder 30 may also cease when cylinder 30 is deactivated.

Fuel injector 68 is shown positioned in cylinder head 13 to inject fuel directly into combustion chamber 30, which is known to those skilled in the art as direct injection. Fuel is delivered to fuel injector 68 by a fuel system including a fuel tank 26, fuel pump 21, fuel pump control valve 25, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Engine air intake system 9 includes intake manifold 44, throttle 62, grid heater 16, charge air cooler 163, turbocharger compressor 162, and intake plenum 42. Intake manifold 44 is shown communicating with optional electronic throttle 62 which adjusts a position of throttle plate 64 to control air flow from intake boost chamber 46. Compressor 162 draws air from air intake plenum 42 to supply boost chamber 46. Compressor vane actuator 84 adjusts a position of compressor vanes 19. Exhaust gases spin turbine 164 which is coupled to turbocharger compressor 162 via shaft 161. In some examples, a charge air cooler 163 may be provided.

Further, an optional grid heater 16 may be provided to warm air entering cylinder 30 when engine 10 is being cold started. Compressor speed may be adjusted via adjusting a position of turbine variable vane control actuator 78 or compressor recirculation valve 158. In alternative examples, a waste gate 79 may replace or be used in addition to turbine variable vane control actuator 78. Turbine variable vane control actuator 78 adjusts a position of variable geometry turbine vanes 166. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 79 or a bypass valve may allow exhaust gases to flow around turbine 164 so as to reduce the amount of energy supplied to the turbine. Compressor recirculation valve 158 allows compressed air at the outlet 15 of compressor 162 to be returned to the inlet 17 of compressor 162. Alternatively, a position of compressor variable vane actuator 78 may be adjusted to change the efficiency of compressor 162. In this way, the efficiency of compressor 162 may be reduced so as to affect the flow of compressor 162 and reduce the possibility of compressor surge. Further, by returning air back to the inlet of compressor 162, work performed on the air may be increased, thereby increasing the temperature of the air. Optional electric machine 165 is also shown coupled to shaft 161. Optional electric machine 165 may rotate compressor 162 when engine 10 is not rotating, when engine 10 is rotating at low speed (e.g., cranking speed such as 250 RPM), or when exhaust energy is low to provide additional boost. Air flows into engine 10 in the direction of arrows 5.

Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99 such that starter 96 may rotate crankshaft 40 during engine cranking. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. An engine start may be requested via human/machine interface (e.g., key switch, pushbutton, remote radio frequency emitting device, etc.) 69 or in response to vehicle operating conditions (e.g., brake pedal position, accelerator pedal position, battery SOC, etc.). Battery 8 may supply electrical power to starter 96 and electric machine 165. Controller 12 may monitor battery state of charge.

Combustion is initiated in the combustion chamber 30 when fuel automatically ignites via combustion chamber temperatures reaching the auto-ignition temperature of the fuel that is injected to cylinder 30. The temperature in the cylinder increases as piston 36 approaches top-dead-center compression stroke. Exhaust gases may be processed via after treatment system 89, which may include sensors and emissions control devices as described herein. In some examples, a universal Exhaust Gas Oxygen (UEGO) sensor 126 may be coupled to exhaust manifold 48 upstream of emissions device 71. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures optional glow plug 66 may convert electrical energy into thermal energy so as to create a hot spot next to one of the fuel spray cones of an injector in the combustion chamber 30. By creating the hot spot in the combustion chamber next to the fuel spray 30, it may be easier to ignite the fuel spray plume in the cylinder, releasing heat that propagates throughout the cylinder, raising the temperature in the combustion chamber, and improving combustion. Cylinder pressure may be measured via optional pressure sensor 67, alternatively or in addition, sensor 67 may also sense cylinder temperature. Exhaust temperature may be determined via temperature sensor 91.

Emissions device 71 can include an oxidation catalyst and it may be followed by a diesel particulate filter (DPF) 72 and a selective catalytic reduction (SCR) catalyst 73, in one example. In another example, DPF 72 may be positioned downstream of SCR 73. NOx sensor 70 provides an indication of NOx concentration that may pass through SCR 73. Exhaust flows in the direction of arrow 7.

Exhaust gas recirculation (EGR) may be provided to the engine via high pressure EGR system 83. High pressure EGR system 83 includes valve 80, EGR passage 81, and EGR cooler 85. EGR valve 80 is a valve that closes or allows exhaust gas to flow from upstream of emissions device 71 to a location in the engine air intake system downstream of compressor 162. EGR may be cooled via passing through EGR cooler 85. EGR may also be provided via low pressure EGR system 75. Low pressure EGR system 75 includes EGR passage 77 and EGR valve 76. Low pressure EGR may flow from downstream of emissions device 71 to a location upstream of compressor 162. Low pressure EGR system 75 may include an EGR cooler 74.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Read-only memory 106 may include a plurality of software modules 106a that perform specific engine control functions (e.g., fuel injection control, EGR control, emissions control).

Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a torque or power demand pedal 130 for sensing pedal position adjusted by human foot 132; a measurement of engine manifold pressure (MAP) from pressure sensor 121 coupled to intake manifold 44 (alternatively or in addition sensor 121 may sense intake manifold temperature); boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle.

In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Thus, the system of FIG. 1 provides for an engine system, comprising: a diesel engine; an after treatment system coupled to the diesel engine; a NOx sensor included in the after treatment system; and a controller including executable instructions stored in non-transitory memory that cause the controller to selectively inhibit the controller from applying output of the NOx sensor to control the diesel engine in response to an amount of energy delivered to the after treatment system. The engine system includes where the amount of energy delivered to the after treatment system is for a present trip of a vehicle that begins with a most recent start of the diesel engine. The engine system includes where selectively inhibiting output of the NOx sensor includes preventing output of the NOx sensor from being applied via software modules within the controller. The engine system further comprises additional instructions to selectively inhibit output of the NOx sensor in response to the amount of energy delivered to the after treatment system being less than a heat energy threshold. The engine system includes where the heat energy threshold is a function of ambient temperature. The engine system includes where the heat energy threshold is a function of an amount of hydrocarbons in the after treatment system. The engine system of includes where the heat energy threshold is a function of an amount of urea in the after treatment system.

Turning now to FIG. 2, a prophetic plot of output of a new or fresh NOx sensor that is supplied fresh air through a conduit is shown. In addition, a prophetic filtered output for a Fourier transform infrared analyzer (FTIR) sensing $NH_3$ in the air that flows through the conduit at a location downstream of the fresh NOx sensor is shown. The plots of FIG. 2 may be representative of NOx sensor output when electrical power is applied to the NOx sensor and when the NOx sensor is exposed to fresh air supplied through a water filled bubbler and the conduit.

The first plot from the top of FIG. 2 is a plot of NOx concentration indicated by a fresh NOx sensor versus time. The vertical axis represents NOx concentration in parts per million (ppm). The horizontal axis represents time and time increases from the left side of the plot to the right side of the plot. Curve 202 represents the NOx concentration as indicated by the fresh NOx sensor when air flows to the fresh NOx sensor via a conduit that holds the fresh NOx sensor.

The second plot from the top of FIG. 2 is a plot of $NH_3$ concentration indicated by a FTIR analyzer versus time. The vertical axis represents $NH_3$ concentration in parts per million. The horizontal axis represents time and time increases from the left side of the plot to the right side of the plot. Curve 204 represents the $NH_3$ concentration as indicated by the FTIR analyzer when air flows through the conduit at a location downstream of the NOx sensor. Thus, the FTIR analyzes air including gases that may be liberated via the NOx sensor after the air passes by the NOx sensor before reaching the FTIR analyzer.

At time t0, electrical power is not applied to the fresh NOx sensor and air flows to the fresh NOx sensor and the FTIR analyzer. The output of the FTIR indicates a low level of $NH_3$ and output of the NOx analyzer is low. The output level of the FTIR analyzer continues on at a low level until time t1. The output of the fresh NOx sensor also continues on at a lower level until time t1 is reached.

At time t1, electric power is delivered to the fresh NOx sensor and the fresh NOx sensor output increases and the FTIR output continues at a lower level. After increasing for a short time, output of the fresh NOx sensor decreases to indicate a negative value and then it gradually rises toward zero.

At time t2, output of the fresh NOx sensor has stabilized at a level that is slightly negative. Thus, the fresh NOx sensor exhibits a small negative bias when air is supplied to the fresh NOx sensor. The output of the FTIR analyzer indicates a very low $NH_3$ reading.

Thus, when a new NOx sensor is exposed to air, its output may indicate a near zero or even a small negative NOx level. Only a very small amount of $NH_3$ is detected in air that flows past the NOx sensor at a location downstream of the NOx sensor in a conduit as detected via a FTIR analyzer.

Referring now to FIG. 3, a prophetic plot of output of an aged NOx sensor that is supplied fresh air through a conduit is shown. In addition, a prophetic filtered output for a Fourier transform infrared analyzer (FTIR) sensing NH₃ in the air that flows through the conduit at a location downstream of the aged NOx sensor is shown. The plots of FIG. 3 may be representative of NOx sensor output when electrical power is applied to the aged NOx sensor and when the aged NOx sensor is exposed to fresh air supplied through a water filled bubbler and the conduit.

The first plot from the top of FIG. 3 is a plot of NOx concentration indicated by an aged NOx sensor versus time. The vertical axis represents NOx concentration in parts per million. The horizontal axis represents time and time increases from the left side of the plot to the right side of the plot. Curve 302 represents the NOx concentration as indicated by the aged NOx sensor when air flows to the aged NOx sensor via a conduit that holds the aged NOx sensor.

The second plot from the top of FIG. 3 is a plot of NH₃ concentration indicated by a FTIR analyzer versus time. The vertical axis represents NH₃ concentration in parts per million. The horizontal axis represents time and time increases from the left side of the plot to the right side of the plot. Curve 304 represents the NH₃ concentration as indicated by the FTIR analyzer when air flows through the conduit at a location downstream of the aged NOx sensor. Thus, the FTIR analyzes air including gases that may be liberated via the aged NOx sensor after the air passes by the aged NOx sensor before reaching the FTIR analyzer.

At time t10, electrical power is not applied to the aged NOx sensor and air flows to the aged NOx sensor and the FTIR analyzer. The output of the FTIR indicates a low level of NH₃ and output of the NOx analyzer is low. The output level of the FTIR analyzer continues on at a low level until time tn. The output of the aged NOx sensor also continues on at a lower level until time t11 is reached.

At time t11, electric power is delivered to the NOx sensor and the NOx sensor output increases and then it decreases until time t12. The FTIR output continues at a lower level. After increasing for a short time after time t11, output of the NOx sensor decreases toward zero.

At time t12, output of the NOx sensor begins increasing again and it increases nearly to 200 parts per million (ppm), which is substantially greater than the output of the fresh NOx sensor shown in FIG. 2. The output of the FTIR analyzer is low at time t12, but it begins to increase shortly thereafter toward a value near 10 ppm. It may be observed that the NH₃ curve profile that is indicated by the FTIR analyzer follows a similar profile as the output of the aged NOx sensor. The NH₃ as measured by the FTIR analyzer may be generated as the aged NOx sensor is heated. The NH₃ increase that was sensed via the FTIR and the increased NOx sensor output may be indicative of urea that is undergoing thermal decomposition. The urea may be held within the aged NOx sensor (e.g., near the NOx sensor talc region or ceramic element).

At time t13, electrical power is removed from the NOx sensor. The output of the FTIR analyzer decays toward a value of zero. Thus, when an aged NOx sensor is exposed to air, its output may indicate a positive NOx level offset. If the offset is sufficiently high, an engine controller may react to the offset and indicate that the engine is not operating as may be expected. Further, the engine controller may adjust engine operation in an attempt to compensate for the observed NOx level.

Referring now to FIG. 4, a method for operating an engine that includes a NOx sensor is shown. The method of FIG. 4 may be stored as executable instructions in non-transitory memory of a controller in systems such as are shown in FIG. 1. The method of FIG. 4 may be incorporated into and may cooperate with the systems of FIG. 1. Further, portions of the method of FIG. 4 may be performed via a controller transforming operating states of devices and actuators in the physical world. The controller may employ engine actuators of the engine system to adjust engine operation according to the method described below. Further, method 400 may determine selected control parameters as described below from sensor inputs.

At 402, method 400 determines or infers vehicle operating conditions from the various sensors that are described herein. Vehicle operating conditions may include but are not limited to a temperature of the engine (e.g., intake manifold temperature or cylinder temperature), engine speed, engine load, boost pressure, a desired driver demand torque, engine air flow, engine exhaust gas temperature, engine exhaust mass flow, and ambient temperature. Method 400 proceeds to 404.

At 404, method 400 determines a heat flux density in the exhaust system and a total amount of energy that is input to the exhaust after treatment system since a most recent engine start. In one example, the heat flux density is determined or estimated at the location of the NOx sensor. Method 400 may determine the heat flux density via the following equation:

$$HFlux = (NH_3tEg - con1) \times con2 \times NH_3mfEg \times \frac{0.001 \text{ kW}}{W}$$

$$Eg\_Eng\_Tot = \int HFlux$$

where HFlux is the heat flux delivered to the exhaust system, $NH_3tEg$ is exhaust gas temperature, con1 is a constant (e.g., scalar real number) representing a saturation temperature of exhaust condensate, con2 is a calibration constant (e.g., scalar real number) representing a specific heat of the exhaust gas, $NH_3mfEg$ is the exhaust gas mass flow rate, and $Eg\_Eng\_tot$ is the total energy that is delivered to the exhaust system since the most recent engine start. The integrator may be reset and enabled as discussed in the description of FIG. 6. FIG. 6 shows an example block diagram of the integration and heat flux determined at 404. Method 400 proceeds to 406.

At 406, method 400 determines a heat flux threshold value. In one example, the heat flux threshold value may be determined as discussed in the description of FIG. 7. The heat flux threshold value may be a function of hydrocarbons stored in an after treatment device, urea stored in the after treatment device, and a difference between an integrated heat flux value and a heat flux threshold value of a most recent or last vehicle trip or drive. Method 400 proceeds to 408.

At 408, method 400 judges if the integrated heat flux is greater than the threshold heat flux value. If so, the answer is yes and method 400 proceeds to 410. Otherwise, the answer is no and method 400 proceeds to 412. FIG. 8 is an example of judging whether or not output of a NOx sensor is available to be released to controller software modules.

At 410, method 400 releases or supplies output of the NOx sensor to processes (e.g., software modules) within the controller. The software modules may adjust engine operation in response to NOx sensor output. For example, if output of the NOx sensor is greater than a threshold, then a fuel injection software module may retard fuel injection timing or the engine EGR amount to reduce NOx output. If output of the NOx sensor is less than a threshold, then the fuel injection software module may advance fuel injection timing to improve vehicle fuel economy. Method 400 proceeds to exit.

At 412, method 400 does not supply output of the NOx sensor to processes within the controller. Instead, method 400 may not execute selected processes, or alternatively, method 400 may supply a predetermined NOx sensor output value to the processes so that the engine may continue to operate until output of the NOx sensor is believed to be valid. Method 400 proceeds to exit.

Thus, the method of FIG. 4 provides for an engine operating method, comprising: adjusting operation of an engine via a controller in response to output of a NOx sensor when output of the NOx sensor is judged valid, the output of the NOx sensor judged valid via the controller when an actual exhaust energy delivered to an exhaust system for a present vehicle trip is greater than a heat energy threshold. The engine method includes where the adjusting operation of the engine includes adjusting fuel injection timing. The engine method includes where the adjusting fuel injection timing includes retarding or advancing start of injection timing.

In some examples, the engine method includes where the adjusting operation of the engine includes adjusting an exhaust gas recirculation amount. The engine method includes where the exhaust energy delivered to the exhaust system is based on a temperature of exhaust gas, specific heat of the exhaust gas, and a mass flow of the exhaust gas. The engine method includes where the actual exhaust energy delivered to the exhaust system is an integrated heat flux. The engine includes where the heat energy threshold is a function of a temperature of an engine during a most recent start of the engine. The engine method includes where the heat energy threshold is a function of exhaust gas temperature.

The method of FIG. 4 also provides for an engine operating method, comprising: adjusting a heat energy threshold as a function of ambient temperature and an amount of hydrocarbons in an after treatment system via a controller; and adjusting operation of an engine via the controller in response to exhaust energy delivered to an after treatment system since a most recent start of an engine being greater than the heat energy threshold. The engine method includes where the exhaust energy delivered to the after treatment system is based on exhaust gas temperature and exhaust gas mass flow. The engine method includes where adjusting engine operation includes adjusting fuel injection timing. The engine method further comprises adjusting the heat energy threshold in further response to a difference between the heat energy threshold and exhaust energy delivered to the after treatment system. The engine method further comprises integrating a heat flux to determine the exhaust energy delivered to the after treatment system.

Referring now to FIG. 5, an example prophetic engine operating sequence for an engine is shown. The operating sequence of FIG. 5 may be produced via the system of FIG. 1 executing instructions of the method described in FIG. 4. The plots of FIG. 5 are aligned in time and occur at the same time. Vertical markers at t20-t22 indicate times of particular interest during the sequence.

The first plot from the top of FIG. 5 represents engine state versus time. Trace 502 represents engine state and the engine is off when trace 502 is at a low level near the horizontal axis. The engine is on and receiving fuel combusting the fuel or at least attempting to combust the fuel via compression ignition when trace 502 is at a higher level near the vertical axis arrow. The vertical axis represents engine state. The horizontal axis represents time and time increases from the left side to right side of the figure.

The second plot from the top of FIG. 5 represents heat flux to the engine's exhaust system and NOx sensor versus time. Trace 504 represents the heat flux to the engine's exhaust system. The vertical axis represents heat flux to the engine's exhaust system and NOx sensor and the heat flux increases in the direction of the vertical axis arrow. The horizontal axis represents time and time increases from the left side to right side of the figure. Horizontal line 550 represents a threshold amount of heat flux.

The third plot from the top of FIG. 5 represents NOx sensor output versus time. Trace 506 represents NOx sensor output in NOx ppm. The vertical axis represents NOx sensor output and NOx sensor output increases in the direction of the vertical axis arrow. The horizontal axis represents time and time increases from the left side to right side of the figure.

The fourth plot from the top of FIG. 5 represents NOx sensor availability versus time.

Trace 508 represents NOx sensor availability and output of the NOx sensor is available to software modules (e.g., emissions controls, EGR controls, fuel injection controls, etc.) when trace 508 is at a higher level near the vertical axis arrow. Output of the NOx sensor is not available to the software modules when trace 508 is at a lower level near the horizontal axis. The horizontal axis represents time and time increases from the left side to right side of the figure.

The fifth plot from the top of FIG. 5 represents start of fuel injection timing versus time. Trace 510 represents fuel injection start of injection time and start of fuel injection advances in the direction of the vertical axis arrow. Start of fuel injection timing is retarded near the horizontal axis. The vertical axis represents start of fuel injection time. The horizontal axis represents time and time increases from the left side to right side of the figure.

At time t20, the engine is stopped (not combusting and not rotating) and it is not being cranked (e.g., rotated under power provided via an electric machine or starter). The heat flux is zero and NOx sensor output is low. The NOx sensor output is not available to software modules within the controller and fuel injection timing is shown as being retarded since fuel is not being injected.

At the time t21, engine cranking begins and fuel injection timing is advanced. The heat flux begins to increase and the NOx sensor output increases to a high level in response to electrical power being applied to the NOx sensor. The NOx sensor output is not available to software modules within the controller.

Between time t21 and time t22, the NOx sensor output decreases after it initially decreased and then it increases again before it begins to fall again. The second increase in NOx sensor output since time t21 may be due to urea that may be thermally decomposing as the exhaust system and NOx sensor are heated via engine exhaust gas. The heat flux increases at a gradual rate and NOx sensor output is not made available to software modules in the controller. The start of fuel injection time is advanced and then it is retarded before it levels out prior to time t22.

At time t22, the engine continues operating (e.g., rotating and combusting fuel) and the amount of heat flux exceeds threshold 550. Therefore, NOx sensor output becomes available to software modules within the controller. The NOx sensor output is greater than expected so the controller retards the start of fuel injection timing, thereby reducing NOx that may be generated by the engine.

Thus, operation of an engine may be adjusted in response to output of a NOx sensor after output of a NOx sensor is made available to software modules within the controller. By adjusting engine operation in response to NOx sensor output after NOx sensor output is made available to engine controller software modules, adjustments to NOx sensor output that may be related to thermal decomposition of urea on or near the NOx sensor temperature of the engine may be avoided. Consequently, engine fuel economy may be maintained. During the time period when NOx sensor output is not available to software modules within the controller, it may be assumed that the engine is outputting NOx at expected levels.

Referring now to FIG. 6, a block diagram that illustrates how heat flux and the integral of heat flux may be determined is shown. The block diagram of FIG. 6 may be a basis for estimating heat flux that is supplied to an exhaust system and NOx sensor. The block diagram of FIG. 6 may be a basis for estimating the heat flux of the exhaust system. Further, the instructions to perform the operations of the block diagram of FIG. 6 may be incorporated into method 400. Thus, the disclosure of the block diagram of FIG. 6 may be incorporated into method 400.

Exhaust gas temperature and a calibration value (call) are input to junction 602 where the calibration value is subtracted from the exhaust gas temperature. In one example, the calibration value call is a value that represents a saturation temperature of exhaust condensate. The result from junction 602 is input to multiplication block 604. A second calibration value that represents the specific heat of the exhaust gas is also input to multiplication block 604. The engine exhaust gas mass flow rate and a conversion factor for changing from Watts to kilo-Watts are also input to multiplication block 604.

The modified exhaust gas temperature, exhaust specific heat value, exhaust gas mass flow, and the conversion factor are multiplied at block 604 to determine the heat flux to the engine exhaust system. The result of the multiplication is input to integrator block 620 and block 610.

Integrator 620 may integrate the output from block 604 during select operating conditions. In particular, integrator 620 may integrate the output from block 604 when integrator 620 is enabled via output from block 618. Memory of integrator 620 may be cleared to a value of zero and integrator 620 may output a value of zero when integrator 620 is reset via output of block 616.

Integrator 620 may be reset when an engine start is detected (e.g., eng_run is set to a value of one or true after being at a value of zero or false) or when a feature reset is requested due to unexpected conditions occurring. If either or both conditions occur, Boolean OR block 616 outputs a value of one or true and integrator 620 is reset. If neither condition occurs, Boolean OR block 616 outputs a value of zero or false and integrator 620 is not reset.

Several conditions may enable the integrator 620 to integrate the output of block 604. Otherwise, the integrator 620 holds its previous value and it does not integrate the output of block 604. Ambient temperature is input to block 606 and block 606 references a table or function that outputs a threshold heat flux value that is based on ambient temperature. Block 606 outputs a threshold heat flux value to block 610. If the output of block 640 is greater than the output of block 606, block 610 outputs a Boolean true. Otherwise, block 640 outputs a Boolean false value. A heat flux threshold exceeded parameter Boolean value is input to block 608 and block 608 applies a unit delay time to the heat flux threshold exceeded parameter. The heat flux threshold exceeded parameter is a value of Boolean true when the heat flux threshold for releasing or making output of the NOx sensor available to software modules in the controller indicates that the heat flux supplied to the engine exhaust exceeds the threshold value. The output of block 608 is input to block 612 and the output of block 608 is equal to the input of block 608 delayed by one sample time. Block 612 performs a Boolean NOT operation on the output of block 608. Block 618 performs a Boolean AND operation on the output of blocks 610 and 612. Thus, if the heat flux is greater than the threshold heat flux value that is based on ambient temperature and the heat flux threshold exceeded parameter Boolean value is false, then the integrator is enabled so that it may begin to integrate the output of block 604.

In this way, heat flux delivered to the engine exhaust system may be determined and integrated. The integrated value that is output from block 620 is the actual exhaust energy provided to the exhaust system since the most recent engine stop while the engine has been continuously operated. The output of block 620 is input to block 708 of FIG. 7 and input to block 802 of FIG. 8.

Referring now to FIG. 7, a block diagram that illustrates how the heat flux threshold may be determined is shown. The block diagram of FIG. 7 may be a basis for estimating the heat flux threshold of the exhaust system. Further, the instructions to perform the operations of the block diagram of FIG. 7 may be incorporated into method 400. Thus, the disclosure of the block diagram of FIG. 7 may be incorporated into method 400.

The engine temperature when the engine was most recently started and the exhaust gas temperature are input to block 712 where they reference or index a table that outputs an empirically determined base exhaust heat flux threshold. The output of block 712 is input to block 720. A mass of hydrocarbons in the after treatment system is input to block 714 where it indexes a value that modifies the base heat flux threshold based on mass of hydrocarbons in the engine after treatment system. The output of block 714 is input to block 720. A mass of urea in the after treatment system is input to block 716 where it indexes a value that modifies the base heat flux threshold based on mass of urea in the engine after treatment system. The output of block 716 is input to block 720. A distance driven via the present vehicle since a most recent engine start is input to block 718 where it indexes a value that modifies the base heat flux threshold based on distance driven by the present vehicle since a most recent engine start. The output of block 718 is input to block 720.

At block 720, the output of blocks 712, 714, 716, and 718 are multiplied together to generate a threshold heat flux value for the present vehicle trip and engine start. The output of block 720 is input to block 722. A difference between accumulated exhaust energy and an exhaust energy threshold that is output from block 710 after a previous engine start (e.g., an engine start before the most recent engine start) is input to block 724. At block 724, logic outputs the difference between accumulated exhaust energy and an exhaust energy threshold that is output from block 710 after a previous engine start if the feature is reset, else if non-volatile memory is reset block 724 outputs a predetermined value, else if the vehicle is turned off after the engine has operated, the output of block 724 is updated with a new difference output from block 710, else the previous value output from block 724 is output from block 724. At block 722, the output of block 720 and output of block 724 are added together to generate a final heat energy threshold value. The output of block 722 is input to block 702 and block 802. Thus, the threshold heat energy threshold may be based on a difference between accumulated exhaust energy and an exhaust energy threshold that is output from block 710 after a previous engine start.

The final heat energy threshold value is input to block 702 and block 702 outputs the input of block 702 delayed by one sample time interval to multiplication block 704. The engine exhaust temperature at the time of the most recent engine start is input to block 706. Block 706 outputs a cold engine start modifier value to multiplication block 704. The output of blocks 702 and 706 are multiplied at block 704 and the output of block 704 is input to block 708. At block 708, the actual amount of exhaust energy for the vehicle's present trip is subtracted from the modified final heat energy threshold that is output from block 708. A heat flux difference for adjusting the final heat energy threshold during a next subsequent trip of the vehicle (e.g., a trip of the vehicle after the vehicle's engine has been stopped) is input to block 710. At block 710, block 710 outputs a value of zero or the heat flux difference between the present heat flux threshold and the actual exhaust energy for the present vehicle trip. The output of block 710 is written to non-volatile memory for use during a next engine start. Block 710 outputs a value of the difference between the present heat flux threshold and the actual exhaust energy for the present vehicle trip if the engine is stopped before the actual exhaust energy for the present vehicle trip does not exceed the present heat flux threshold value. Otherwise, block 710 outputs a value of zero. The output of block 710 is input to block 724 for the next engine start.

Thus, the block diagram of FIG. 7 shows how a final heat energy threshold may be determined. The final heat energy threshold may be determined so that method 400 may prevent output of the NOx sensor from being used by software modules in the controller until an offset of the output of the NOx sensor may subside. Controlling application of NOx sensor output via exhaust heat flux may provide improvements over controlling output of the NOx sensor based on a timer because exhaust heat flux may be more indicative of whether or not conditions for bias in the NOx sensor are present or not. As a result, if heat flux is high, then output of the NOx sensor may be released to software modules of the controller sooner. If heat flux is low, then output of the NOx sensor may be released to software modules of the controller later.

Referring now to FIG. 8, a block diagram that illustrates logic for determining whether or not output of a NOx sensor is made available to software modules within the controller is shown. The block diagram of FIG. 8 may be a basis for releasing NOx sensor output to software modules within the controller. Further, the instructions to perform the operations of the block diagram of FIG. 8 may be incorporated into method 400. Thus, the disclosure of the block diagram of FIG. 8 may be incorporated into method 400.

The actual exhaust energy for the current or present vehicle trip is input to block 802 alone with the final heat energy. If the actual exhaust energy for the present vehicle trip is greater than the final heat energy, block 802 outputs a Boolean true state. Otherwise, block 802 outputs a Boolean false state. System based NOx sensor output release requests are input to block 804 and block 804 performs a Boolean NOT operation of the system based NOx sensor output release requests. The output of block 802 and the output of block 804 are input to block 806. Block 806 performs a Boolean OR operation on the output of blocks 802 and 804. Block 806 outputs a Boolean true value if either of the output of block 802 or block 804 is true. Otherwise, the output of block 806 is false. If the output of block 806 is true, block 808 indicates that NOx sensor output is valid by outputting a value that indicates valid NOx sensor output. Otherwise, block 808 indicates that NOx sensor output is not valid by outputting a value that indicates invalid NOx sensor output.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system, comprising:
a diesel engine;
an after treatment system coupled to the diesel engine;
a NOx sensor included in the after treatment system; and a controller including executable instructions stored in non-transitory memory that cause the controller to selectively inhibit the controller from applying output of the NOx sensor to control the diesel engine in response to an amount of energy delivered to the after treatment system, where the amount of energy delivered to the after treatment system is for a present trip of a vehicle that begins with a most recent start of the diesel engine, and where the amount of energy delivered to the after treatment system is based on an integrated heat flux, and where the integrated heat flux is based on an exhaust gas mass flow rate.

2. The engine system of claim 1, where selectively inhibiting output of the NOx sensor includes preventing output of the NOx sensor from being applied via software modules within the controller.

3. The engine system of claim 1, further comprising additional instructions to selectively inhibit output of the NOx sensor in response to the amount of energy delivered to the after treatment system being less than a heat energy threshold.

4. The engine system of claim 3, where the heat energy threshold is a function of ambient temperature.

5. The engine system of claim 3, where the heat energy threshold is a function of an amount of hydrocarbons in the after treatment system.

6. The engine system of claim 3, where the heat energy threshold is a function of an amount of urea in the after treatment system.

7. The engine system of claim 1, where the integrated heat flux is further based on a saturation temperature of exhaust condensate.

8. The engine system of claim 7, where the integrated heat flux is further based on an exhaust gas temperature.

\* \* \* \* \*